(12) United States Patent
Brundage et al.

(10) Patent No.: US 7,678,346 B2
(45) Date of Patent: Mar. 16, 2010

(54) DUAL FUNCTION CO CLEAN-UP/SORBER UNIT

(75) Inventors: Mark A Brundage, Pittsford, NY (US); Taichiang P Yu, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1975 days.

(21) Appl. No.: 10/354,542

(22) Filed: Jan. 30, 2003

(65) Prior Publication Data

US 2004/0148861 A1    Aug. 5, 2004

(51) Int. Cl.
*B01J 8/02*    (2006.01)
(52) U.S. Cl. .................................. 422/180; 422/177
(58) Field of Classification Search ............... 422/169, 422/188, 190, 191, 193, 211, 177, 180, 171; 423/246, 656, 657, 247; 205/746, 169; 502/527.12, 502/527.13
See application file for complete search history.

(56) References Cited

U.S. PATENT DOCUMENTS

| | | | |
|---|---|---|---|
| 3,067,002 A | 12/1962 | Reid | |
| 3,939,062 A | 2/1976 | Sinfelt et al. | |
| 4,172,817 A | 10/1979 | Yates et al. | |
| 4,303,552 A | 12/1981 | Ernest et al. | |
| 4,377,495 A | 3/1983 | Tse | |
| 4,417,083 A | 11/1983 | Bernard et al. | |
| 4,447,551 A | 5/1984 | Fung et al. | |
| 4,514,284 A | 4/1985 | Wairegi et al. | |
| 4,517,076 A | 5/1985 | Boyle et al. | |
| 4,518,708 A | 5/1985 | Krishnamurthy et al. | |
| 4,537,839 A | 8/1985 | Cameron | |
| 4,994,247 A | 2/1991 | Tooley et al. | |
| 5,009,872 A * | 4/1991 | Chuang et al. ............ 423/245.3 |
| 5,017,357 A | 5/1991 | Kolts et al. | |
| 5,114,901 A | 5/1992 | Tsang et al. | |
| 5,200,375 A | 4/1993 | Dessau | |
| 5,202,299 A | 4/1993 | Symons et al. | |
| 5,238,670 A | 8/1993 | Louise et al. | |
| 5,248,566 A | 9/1993 | Kumar et al. | |
| 5,271,916 A * | 12/1993 | Vanderborgh et al. ........ 423/246 |
| 5,316,871 A | 5/1994 | Swathirajan et al. | |
| 5,482,680 A | 1/1996 | Wilkinson et al. | |
| 5,492,679 A * | 2/1996 | Ament et al. ............... 422/180 |
| 5,518,705 A | 5/1996 | Buswell et al. | |
| 5,609,832 A * | 3/1997 | Mieville et al. ............ 422/173 |
| 5,612,012 A | 3/1997 | Soma et al. | |
| 5,637,415 A | 6/1997 | Meltser et al. | |
| 5,702,838 A | 12/1997 | Yasumoto et al. | |
| 6,162,558 A | 12/2000 | Borup et al. | |
| 6,245,214 B1 * | 6/2001 | Rehg et al. ................. 205/764 |
| 6,528,032 B1 * | 3/2003 | Nojima et al. .............. 423/247 |
| 6,576,203 B2 * | 6/2003 | Abe et al. ................... 422/191 |
| 6,692,545 B2 * | 2/2004 | Gittleman et al. ............ 48/128 |
| 6,964,692 B2 * | 11/2005 | Gittleman et al. ............ 48/128 |
| 6,969,505 B2 * | 11/2005 | Tonkovich et al. ........ 423/648.1 |

FOREIGN PATENT DOCUMENTS

| | | | |
|---|---|---|---|
| EP | 0 764 466 A2 | 3/1997 | |
| JP | 53109874 A * | 9/1978 | ................. 422/177 |
| JP | 256112/95 | 10/1995 | |
| JP | 101303/98 | 4/1998 | |
| JP | 261425/98 | 9/1998 | |

OTHER PUBLICATIONS

European Search Report, Application No. EP 99 11 3065.

* cited by examiner

*Primary Examiner*—Stuart Hendrickson
(74) *Attorney, Agent, or Firm*—Harness, Dickey & Pierce, P.L.C.

(57) ABSTRACT

A preferential oxidation reactor (PrOx) is provided including a plurality of substrates defining a plurality of channels, through which a reformate stream flows. A CO-sorption layer and a CO-catalyst layer coat a surface of each substrate support member. The PrOx operates in a first mode, generally at a temperature below 100° C., whereby the CO-sorption material adsorbs CO from the reformate stream. After operation in the first mode, the PrOx operates in a second mode, generally at a temperature above 100° C., whereby the CO-catalyst material enables a preferential oxidation reaction of CO in the reformate stream with a supply of oxygen and desorption of the CO previously absorbed by the CO-sorption layer for an overall reduction in the CO content of the reformate stream.

10 Claims, 2 Drawing Sheets

DUAL FUNCTION CO CLEAN-UP/SORBER UNIT

FIELD OF THE INVENTION

The present invention relates to fuel cells and more particularly to carbon monoxide removal from a reformate stream.

BACKGROUND OF THE INVENTION

Fuel cells have been proposed for many applications that include electrical vehicular power plants to replace internal combustion engines. In a particular type of fuel cell, namely a proton exchange membrane (PEM) fuel cell, hydrogen is used as the fuel and is supplied to an anode of the fuel cell and oxygen (such as air) is the oxidant and is supplied to a cathode of the fuel cell. A typical fuel cell is described in U.S. Pat. No. 5,316,871 to Swathirajan, et al.

The hydrogen ($H_2$) used in the fuel cell can be extracted from the reformation of methanol or other organics (e.g. hydrocarbons). Unfortunately, the resulting reformate includes undesirably high concentrations of carbon monoxide (CO) which can quickly poison the catalyst of the PEM anode, and therefore, must be removed. For example, in gasoline autothermal reforming steam ($H_2O$), air ($O_2$) and gasoline are reacted in a fuel processor that contains two reaction types. An inlet section promotes a partial oxidation (POX) reaction, which provides the thermal conditions required to promote steam reforming (SR) in an exit section.

These reactions are accomplished heterogeneously within a chemical reactor that provides the necessary thermal energy throughout a catalyst mass and yields a reformate gas comprising $H_2$, carbon dioxide ($CO_2$), CO and $H_2O$. Because the CO (about 5-10%) contained in the $H_2$-containing reformate stream exiting the reformer poisons the PEM anode, the CO must be removed or reduced to a non-toxic concentration.

It is known that the CO level of the reformate can be reduced by utilizing a water-gas shift (WGS) reaction. To achieve this, a WGS reactor is provided, within which $H_2O$ (as steam) is added to the reformate exiting the reformer, in the presence of a suitable catalyst, to lower its temperature and increase the steam to carbon ratio therein. A lower temperature and higher steam to carbon ratio serve to lower the carbon monoxide content of the reformate according the following ideal shift reaction: $CO+H_2O \rightarrow CO_2+H_2$.

However, some CO still survives the WGS reaction. Depending upon the reformate flow rate and the steam injection rate, the CO content of the gas exiting the shift reactor can be as low as 0.5 mole %. Hence, the shift reactor reformate comprises $H_2$, $CO_2$, $H_2O$ and some CO. As a result, the WGS reaction does not sufficiently reduce the carbon monoxide content of the reformate to stack grade (i.e. to below about 20 ppm).

Therefore, it is necessary to further remove carbon monoxide from the hydrogen-containing reformate stream exiting the shift reactor, and prior to supplying it to the fuel cell. It is known to further reduce the CO content of $H_2$-containing reformate exiting the WGS reactor by a so-called preferential oxidation (PrOx) reaction effected in a suitable PrOx reactor. The PrOx reactor comprises a catalyst bed operated at a temperature that promotes the preferential oxidation of the CO by air, in the presence of the $O_2$ but without consuming substantial quantities of the $H_2$. The PrOx reaction is: $CO+\frac{1}{2}O_2 \rightarrow CO_2$.

Often, the $O_2$ required for the PrOx reaction will be about two times the stoichiometric amount required to react the CO in the reformate. If the amount of $O_2$ is excessive, then excessive consumption of $H_2$ results. On the other hand, if the amount of $O_2$ is not more than the stoichiometric amount needed, insufficient CO oxidation will occur. The PrOx process is described in a paper entitled, "Methanol Fuel Processing For Low Temperature Fuel Cells" published in the Program and Abstracts of the 1988 Fuel Cell Seminar, Oct. 23-26, 1988, Long Beach, Calif. and in U.S. Pat. No. 5,271,916 to Vanderbourgh and U.S. Pat. No. 5,637,415 to Mester, iner alia. U.S. Pat. Nos. 5,637,415 and 5,316,871, which are each incorporated herein by reference.

One particular area of concern for WGS and PrOx reactors is start-up, or light-off, during which an unacceptably high amount of CO makes it through the WGS and PrOx reactors to the fuel cell stack. This is due to the fact that during this initial time period, the WGS and PrOx reactors have not achieved an operating temperature (approximately >100° C.), whereby the catalyst material is active for catalyzing the CO oxidation reaction.

Therefore, it is desirable in the industry to provide improved WGS and PrOx reactors for reducing CO concentration within a fuel reformate. The PrOx reactor should enable quicker light-off during start-up to limit unacceptable levels of CO being released from the PrOx to the fuel cell stack.

SUMMARY OF THE INVENTION

Accordingly, the present invention provides a preferential oxidation reactor (PrOx) for reducing a carbon monoxide content of a reformate stream. The PrOx includes a substrate support assembly having a plurality of substrate support members configured for providing a plurality of flow channels, a sorption material operatively attached to each of said substrate support members and a catalyst operatively attached to each of said substrate support members. The sorption material reduces the carbon monoxide content when the PrOx is operating within a first temperature range and the catalyst reduces the carbon monoxide in conjunction with the sorption material when PrOx is operating within a second temperature range.

The first temperature range is generally defined as the light-off temperature, being approximately <100° C. The second temperature range is generally defined as the "normal" PrOx operating temperature, being approximately >100° C., whereby the catalyst is able to catalyze a CO oxidation reaction.

The present invention provides a first advantage by enabling quicker start-up of the PrOx, resulting in a cleaner reformate stream being supplied to the fuel cell stack. A second advantage of the present invention is the easy transition between start-up of the PrOx and normal operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
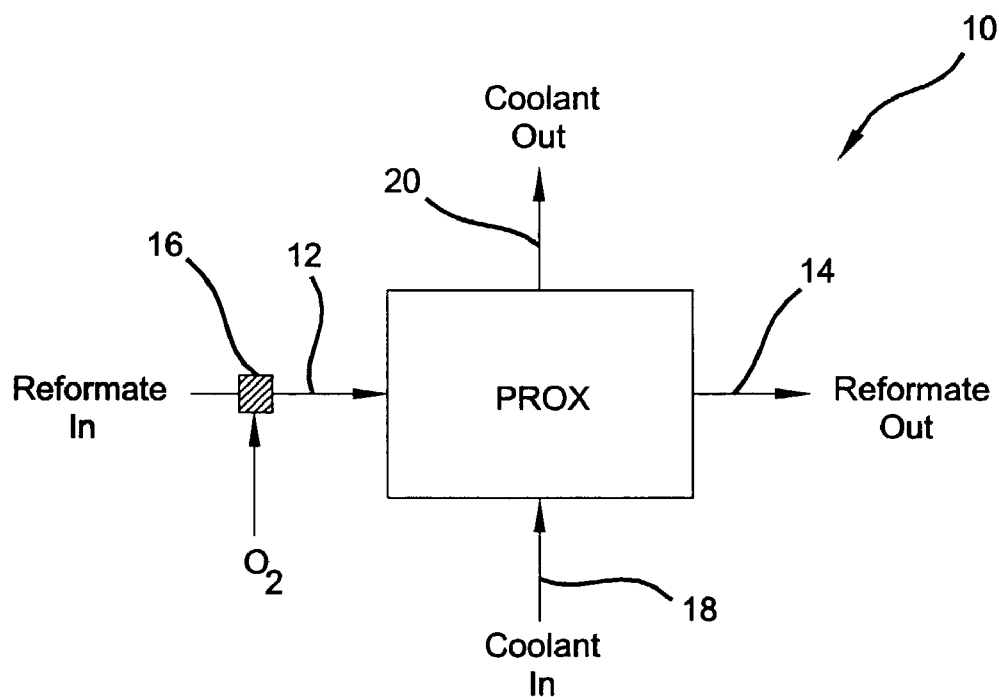
FIG. 1 is a schematic view of a preferential oxidation reactor in accordance with the principles of the present invention.

With reference to FIG. 1, the present invention provides a preferential oxidation reactor (PrOx) 8. The PrOx 8 is implemented to treat a CO contaminate in an $H_2$-rich reformate stream, regardless of the method by which the stream was obtained. The stream may be prepared from methanol, or other hydrocarbons, for example an alkane ($C_nH_{2n+2}$), or other aliphatic or aromatic hydrocarbons. In the case of such acyclic hydrocarbons several steps for preparation include prior partial oxidation in air, reaction with steam, and one or more water-gas shift steps to obtain the CO contaminated, $H_2$-containing reformate stream to be treated by the PrOx 8.

The PrOx 8 includes a main reactor section 10 having an inlet conduit 12 conveying the reformate flow into the PrOx 8 and an outlet conduit exhausting the reformate flow from the PrOx 8. The reformate stream entering the PrOx 8 is mixed with oxygen (i.e. air) injected into the stream ahead of the PrOx 8 via a controllable valve 16 and exits the PrOx 8 having a significantly lower CO content. It will be appreciated that the control valve 16 may be replaced by other means, such as a pulsed air injector. The main reactor section 10 further includes a coolant inlet 18 and a coolant outlet 20 that enable respective conveyance and exhaust of a coolant medium for extracting heat from the main reactor section 10 with the reactor section stream flowing therethrough. The PrOx 8 facilitates both CO sorption in the presence of a sorption material, such as, but not limited to hopcalite and zeolite, as well as selective oxidation of CO in the presence of a catalyst, such as an Ir-catalyst. Further, through the cooling medium, the PrOx 8 maintains the main reactor section 10 temperature within a desired range for efficient operation.

Figure 2:
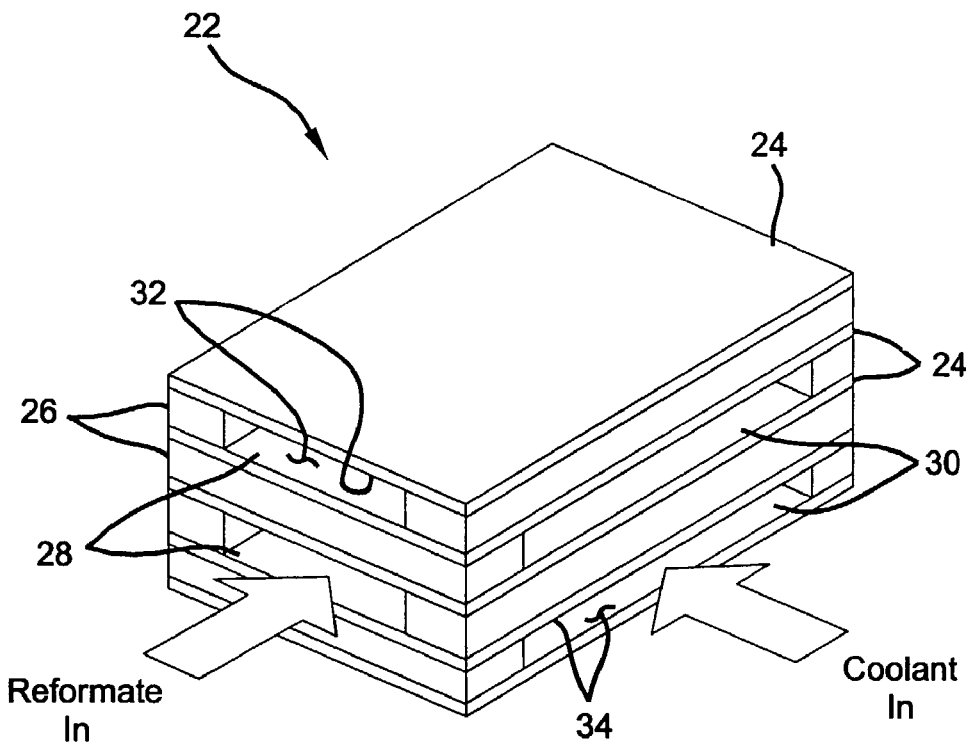
FIG. 2 is a partial perspective, sectional view of an internal portion of the preferential oxidation reactor.

With reference to FIG. 2, a schematic view of an internal portion 22 of the main reactor section 10, is shown. The internal portion 22 includes generally parallel lying substrates 24 separated by separators 26. The substrates 24 are offset from one another for providing generally perpendicular flow passages 28, 30 therebetween. A first set of flow passages 28 enable reformate flow between the adjacent substrates 24. A second set of flow passages 30 enable coolant medium flow therebetween. The substrates 24 each have a first surface 32 carrying the active catalyst and sorption material and a second surface 34 opposite the first surface for heat transfer to a cooling medium. Accordingly, the first surfaces 32 face the reformate flow passages 28 and are in fluid contact with reformate flowing therethrough, and the second surfaces 34 face the coolant flow passages 30 and are in fluid communication with coolant flowing therethrough. In this manner, exothermic heat resulting from the CO oxidation reaction is removed, thereby maintaining the active catalyst within a desired temperature range. Thus, the PrOx 8 also functions as a heat exchanger.

Figure 3:
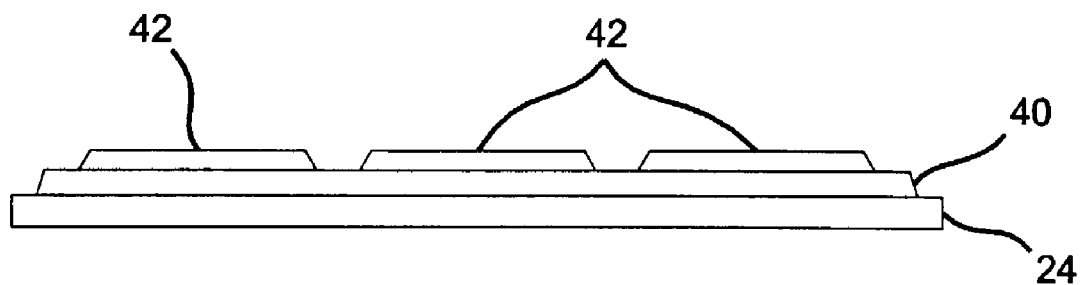
FIG. 3 is a cross-sectional view of a first preferred embodiment of a support member substrate of the preferential oxidation reactor.

With particular reference to FIG. 3, the configuration of the substrate 24 will be described in accordance with a first preferred embodiment. The first surface 32 of substrate 24 includes a CO-sorption layer 40 and a catalyst layer 42. In the embodiment of FIG. 3, the CO-sorption layer 40 is deposited on the substrate 24 subjacent the catalyst layer 42 which includes multiple strips atop the CO-sorption layer 40. In this manner, as the reformate stream flows over the substrate 24, it is concurrently in contact with both the catalyst 42 layer and the CO-sorption layer 40. It is anticipated that alternatively, the catalyst layer 42 may be subjacent the CO-sorption layer 40.

Figure 4:
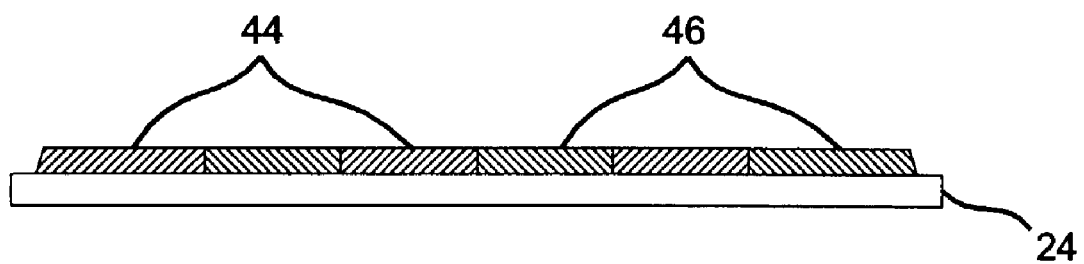
FIG. 4 is a cross-sectional view of a second preferred embodiment of the support member substrate of the preferential oxidation reactor.

With particular reference to FIG. 4, the configuration of the substrate 24 will be described in accordance with a second preferred embodiment. The first surface 32 of the substrate 24 includes a single mixed layer including a CO-sorption component 44 and a catalyst component 46. In this manner, as the reformate stream flows over the substrate 24, it is concurrently in contact with both the catalyst component 46 and the CO-sorption component 44.

It will be appreciated that the substrate 24 of FIGS. 3 and 4 illustrate exemplary configurations for catalyst and CO-sorption material configuration thereon. It is anticipated that various alternative configurations for the catalyst and CO-sorption material are possible and within the scope of the present invention.

In operation, prior to activation (i.e. during a start-up period), the PrOx 8 is initially at a rest temperature, well below 100° C. During this period, the catalyst 42, 46 is inactive, inoperable for reacting the reformate stream to remove CO. However, during the start-up period, the CO-sorption material 40, 44 is active and absorbs CO from the reformate stream as it flows over the substrate 24 and contacts the CO-sorption material 40, 44. Eventually, the PrOx 8 heats to above 100° C., thereby activating the catalyst layer 42, 46, representing the end of the start-up period and the beginning of the normal operation period. During normal operation, the catalyst 42, 46 enables reaction of the reformate stream with oxygen supplied therein, as described above, to reduce the CO count of the reformate stream. Concurrently, heat from the catalytic reactions enable desorption of the CO that had been previously absorbed by the CO-sorption layer 40, 44 for reaction with the oxygen. In this manner, the CO-sorption material 40, 44 is effectively "cleaned" of CO, and further CO-sorption during a subsequent start-up period is enabled.

The description of the present invention is merely exemplary in nature and, thus, variations that do not depart from the gist of the invention are intended to be within the scope of the invention. Such variations are not to be regarded as a departure from the spirit and scope of the invention.

What is claimed is:

1. A reactor for reducing a carbon monoxide (CO) content of a reformate stream comprising:

a support assembly including a reaction section having a plurality of substrates configured for providing a first plurality of flow channels for reformate flow and a second plurality of flow channels for coolant flow, wherein each of said plurality of substrates has a first surface and a second surface opposite thereto, wherein at least a portion of said plurality of substrates has said first surface exposed to reformate and has said second surface in heat transfer relationship with a coolant;

a sorption material coating at least a portion of each first surface of said substrates;

a catalyst coating at least a portion of each first surface of said substrates, wherein said portion of said first surface having a sorption material coating is discrete from said portion of said first surface having said catalyst coating;

wherein said sorption material is active for adsorbing carbon monoxide (CO) to reduce the CO content of the reformate stream flowing through said first plurality of flow channels when the reactor is operating in a first mode; and wherein said catalyst enables a preferential oxidation reaction of CO to reduce the CO content of the reformate stream when the reactor is operating in a second mode.

2. The reactor of claim 1, wherein said catalyst comprises iridium.

3. The reactor of claim 1, wherein said sorption material comprises hopcalite.

4. The reactor of claim 1, wherein said sorption material comprises zeolite.

5. The reactor of claim 1, wherein said sorption material is selected from a group consisting essentially of hopcalite, zeolite and combinations thereof.

6. The reactor of claim 1, wherein said sorption material and said catalyst material are applied in a single layer on said first surface of said substrate, said single layer having alternating regions of said sorption material and said catalyst.

7. The reactor of claim 1, wherein said first and second modes are defined as a function of a reactor operating temperature, said first mode having an operating temperature not greater than about 100° C.

8. The reactor of claim 1, wherein said first and second modes are defined as a function of a reactor operating temperature, said second mode having an operating temperature not less than about 100° C.

9. A preferential oxidation reactor for reducing a carbon monoxide (CO) content of a reformate stream comprising:

a preferential oxidation reaction section having an effluent outlet and a support assembly having a plurality of substrates configured for providing a first plurality of flow channels for reformate and oxygen-containing stream flow, and a second plurality of flow channels for coolant flow, wherein each of said plurality of substrates has a first surface and a second surface opposite thereto, wherein at least a portion of said plurality of substrates has said first surface exposed to reformate and has said second surface in heat transfer relationship with a coolant;

a carbon monoxide (CO) sorption material coating at least a portion of each said first surface of said substrates to reduce the CO content of the reformate stream when the reactor is operating in a first mode;

a catalyst coating at least a portion of each said first surface of said substrates, wherein said catalyst enables a preferential oxidation reaction of CO to reduce the CO content of the reformate stream when the reactor is operating in a second mode, wherein said portion of said first surface having a sorption material coating is discrete from said portion of said first surface having said catalyst coating;

wherein a treated effluent stream exits said through said effluent outlet of said reaction section via said first plurality of flow channels and has a carbon monoxide (CO) concentration of less than about 20 ppm.

10. A reactor for reducing a carbon monoxide (CO) content of a reformate stream comprising:

a support assembly including a reaction section having a plurality of substrates configured for providing a first plurality of flow channels for reformate flow and a second plurality of flow channels for coolant flow, wherein each of said plurality of substrates has a first surface and a second surface opposite thereto, wherein at least a portion of said plurality of substrates has said first surface exposed to reformate and has said second surface in heat transfer relationship with a coolant;

a sorption material coating at least a portion of each first surface of said substrates;

a catalyst coating at least a portion of each first surface of said substrates, wherein said sorption material and said catalyst coating are applied in a single layer on said first surface of said substrate, said single layer having alternating regions of said sorption material and said catalyst coating;

wherein said sorption material is active for adsorbing carbon monoxide (CO) to reduce the CO content of the reformate stream flowing through said first plurality of flow channels when the reactor is operating in a first mode; and wherein said catalyst enables a preferential oxidation reaction of CO to reduce the CO content of the reformate stream when the reactor is operating in a second mode.

* * * * *